(12) United States Patent
Gutierrez

(10) Patent No.: US 10,919,434 B2
(45) Date of Patent: Feb. 16, 2021

(54) LIGHT GUARD ASSEMBLY

(71) Applicant: Lund Motion Products, Inc., Buford, GA (US)

(72) Inventor: Carlos Gutierrez, Norwalk, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 0 days.

(21) Appl. No.: 16/593,156

(22) Filed: Oct. 4, 2019

(65) Prior Publication Data

US 2020/0130560 A1 Apr. 30, 2020

Related U.S. Application Data

(60) Provisional application No. 62/793,576, filed on Jan. 17, 2019, provisional application No. 62/751,482, filed on Oct. 26, 2018.

(51) Int. Cl.
*B60Q 1/00* (2006.01)
*F21S 41/55* (2018.01)
*F21V 15/02* (2006.01)
*B62D 65/16* (2006.01)
*F21S 43/50* (2018.01)
*B60Q 1/04* (2006.01)

(52) U.S. Cl.
CPC ........... *B60Q 1/0005* (2013.01); *B62D 65/16* (2013.01); *F21S 41/55* (2018.01); *F21S 43/51* (2018.01); *F21V 15/02* (2013.01); *B60Q 1/04* (2013.01)

(58) Field of Classification Search
CPC ........ B60Q 1/0005; F21S 41/55; F21S 43/51; B62D 65/16; F21V 15/02

USPC .......................................................... 362/376
See application file for complete search history.

(56) References Cited

U.S. PATENT DOCUMENTS

| | | | | |
|---|---|---|---|---|
| 1,993,675 A * | 3/1935 | Long | ...................... | B61D 11/00 362/505 |
| 2,830,174 A * | 4/1958 | Gagnier | ................... | F21S 41/43 362/509 |
| 3,814,927 A * | 6/1974 | Buzza | ..................... | F21L 14/02 362/296.07 |
| 5,113,323 A * | 5/1992 | Allman | ................ | B60Q 1/0005 362/376 |
| 7,314,245 B1 * | 1/2008 | Shymkiw | ............. | B60Q 1/0005 293/142 |
| 2001/0024369 A1 * | 9/2001 | Kitchin | ................... | B63B 45/02 362/477 |
| 2003/0035292 A1 * | 2/2003 | Thome | .................... | F21V 15/02 362/376 |
| 2007/0045017 A1 * | 3/2007 | Takeshima | ............... | B62K 5/01 180/69.4 |
| 2007/0252396 A1 * | 11/2007 | Kang | ..................... | B60R 19/52 293/115 |

(Continued)

*Primary Examiner* — Bryon T Gyllstrom
(74) *Attorney, Agent, or Firm* — Knobbe Martens Olson & Bear, LLP

(57) ABSTRACT

Disclosed herein are embodiments of a light guard assembly for use with a vehicle and methods of installing a light guard assembly on a vehicle. The light guard assembly can include a frame and a light guard where each of the frame and the light guard include mounting portions such as clips, projections, grips, and/or latches. The frame can be assembled on the vehicle and the light guard can be coupled to the frame. The light guard assembly can be attached to or installed on the vehicle without removing the grille shell of the vehicle.

15 Claims, 9 Drawing Sheets

(56) References Cited

U.S. PATENT DOCUMENTS

| | | | |
|---|---|---|---|
| 2009/0203275 A1* | 8/2009 | Dehn | A43B 7/081 442/1 |
| 2013/0187395 A1* | 7/2013 | Hanson | B60R 19/52 293/115 |
| 2013/0267377 A1* | 10/2013 | Jenkins, Jr. | B60W 20/40 477/3 |
| 2018/0194271 A1* | 7/2018 | Eboli, Jr. | F21S 45/10 |

* cited by examiner

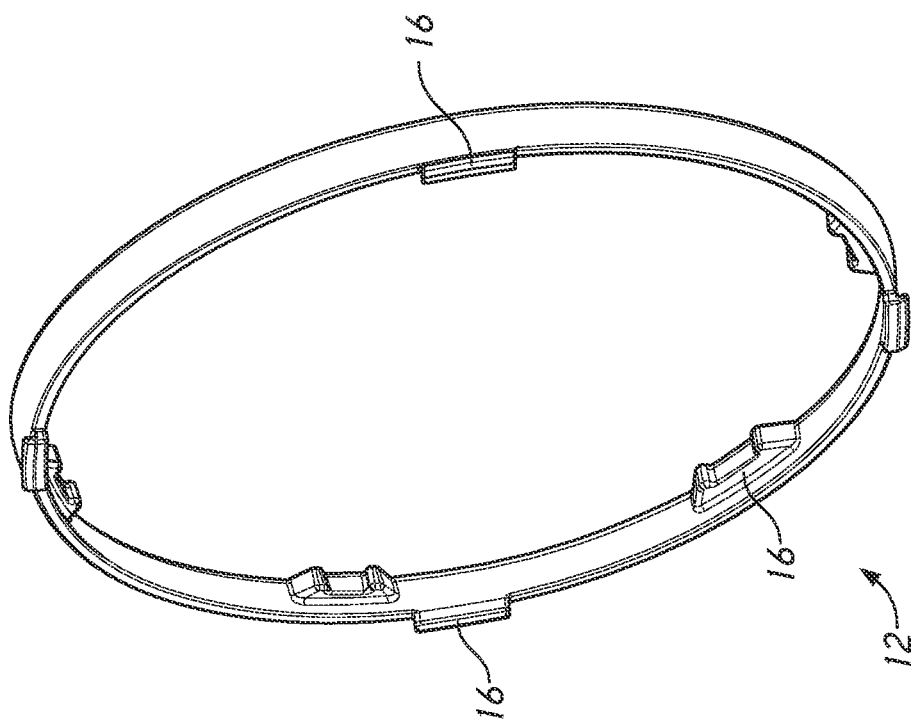
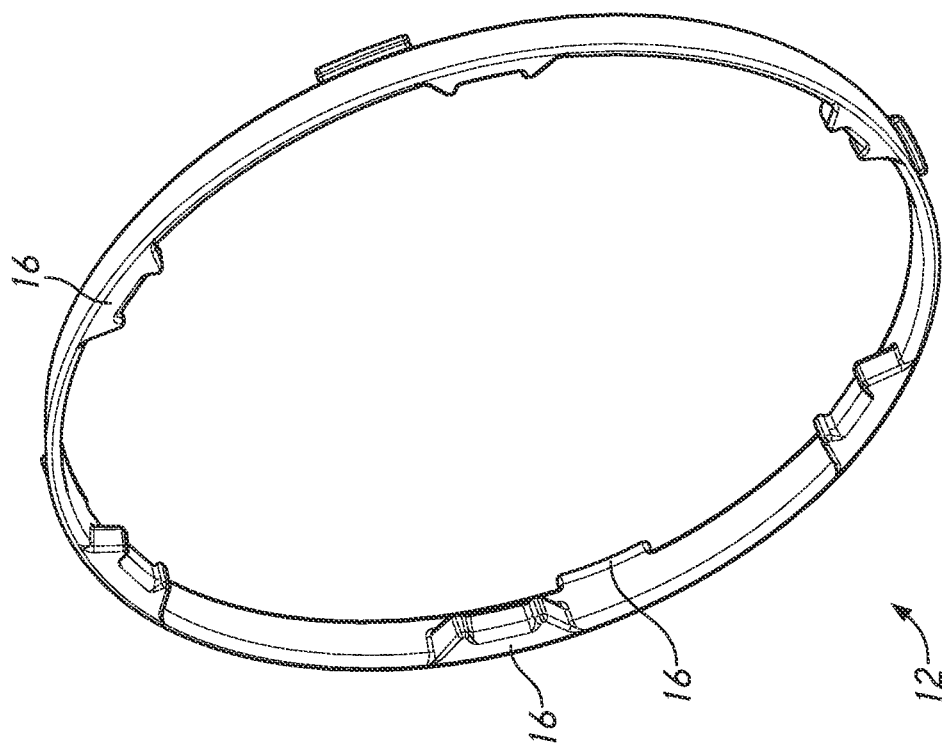

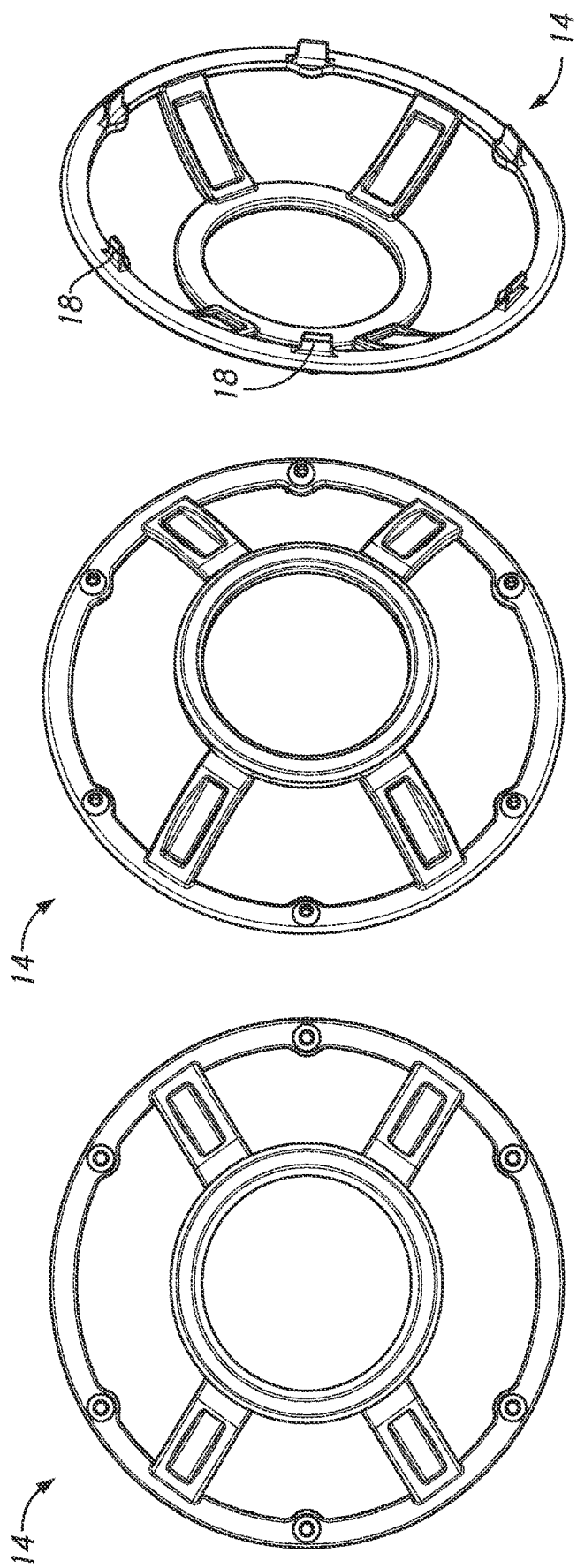

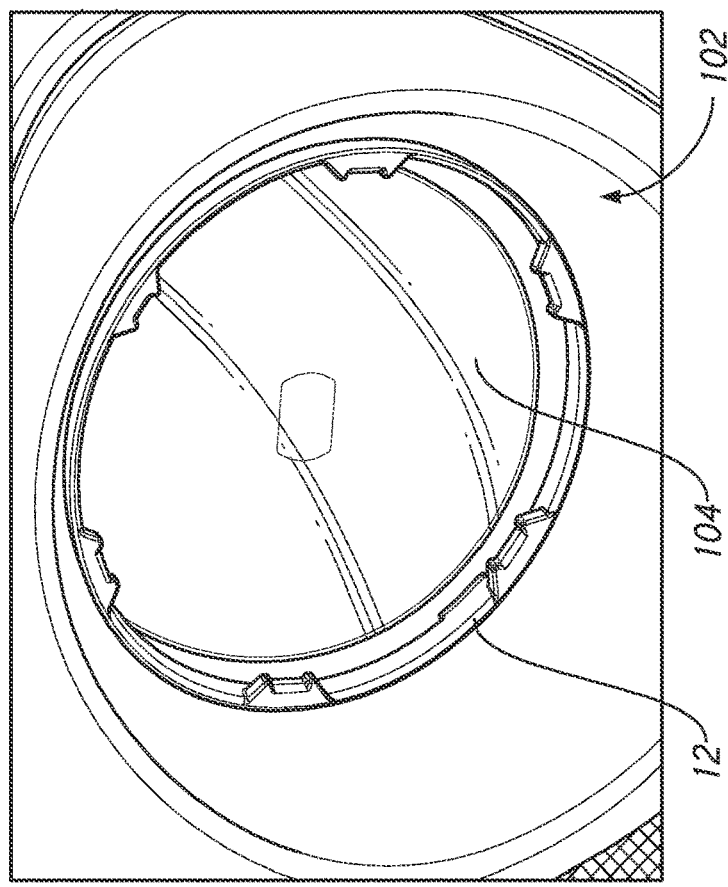
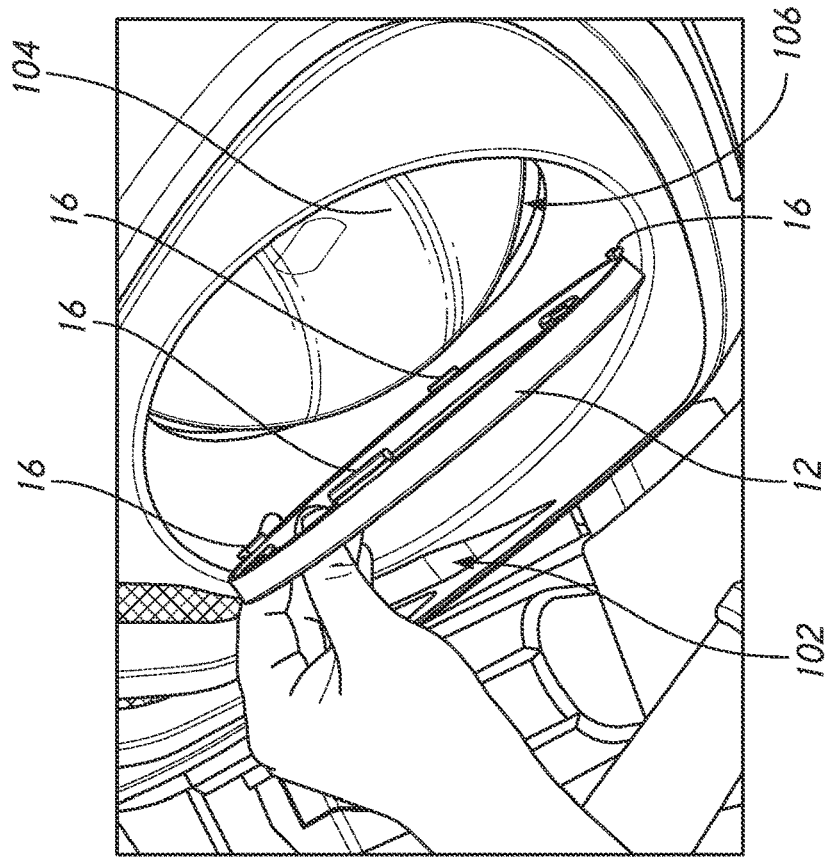
FIG. 9B
FIG. 9A

LIGHT GUARD ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to light guard assemblies and related methods.

Description of the Related Art

Light guard assemblies are configured for protecting lights on vehicles.

SUMMARY

Disclosed herein are embodiments of a light guard assembly, comprising a frame with a first mounting portion configured to couple to an edge of an opening in a grille shell of a vehicle adjacent to a light, and a light guard with a front face and a second mounting portion configured to attach to the frame. The light guard including at least one beam projecting outward away from the first mounting portion and the second mounting portion. Desirably, the at least one beam forms a portion of a cage extending across at least the majority of the span of the front face in at least one direction.

Also disclosed herein are embodiments of a method of installing a light guard assembly on a vehicle, the method comprising providing a first frame and a second frame, the first frame and the second frame having different sizes, selecting one of the first frame and the second frame, attaching the selected frame with a first mounting portion to an edge of an opening in a grille shell of the vehicle adjacent to a light, and attaching a light guard with a front face and a second mounting portion to the selected frame, wherein the light guard comprises at least one beam or member extending across the front face of the light guard, and wherein the light guard assembly is attached to the vehicle without removing the grille shell. In some embodiments, the light guard can include a plurality of members extending across the front face of the light guard.

In some embodiments, there can be a gap between the light and the frame when the frame is attached to the vehicle.

In some embodiments, at least one of the first mounting portion and the second mounting portion can include a clip. In some embodiments, each of the first and second mounting portions can include a clip.

In some embodiments, at least one beam can include a portion of a cage extending across at least the majority of the span of the front face in at least one direction.

In some embodiments, the light guard assembly can be configured to be attached to the vehicle without removing the grille shell of the vehicle.

In some embodiments, the frame and the light guard can be integral. In some embodiments, the frame and the light guard can be separate components.

In some embodiments, the sizes of the first frame and the second frame can correspond to a size of the opening in the grille shell.

In some embodiments, the selected frame can be attached to the edge of the opening in the grille shell of the vehicle without contacting a surface of the light.

In some embodiments, the light guard can be attached to the selected frame before the selected frame is attached to the edge of the opening in the grille shell of the vehicle. In some embodiments, the selected frame can be attached to the edge of the opening in the grille shell of the vehicle before the light guard is attached to the selected frame.

BRIEF DESCRIPTION OF THE DRAWINGS

These and other features and advantages of the present devices, systems, and methods will become appreciated as the same becomes better understood with reference to the specification, claims and appended drawings wherein:

FIGS. 4A, 4B, 5A, and 5B show embodiments of a frame;

FIGS. 6A, 6B, 7A, 7B, and 7C show embodiments of a light guard;

FIGS. 9A and 9B show a method of installing a frame on a vehicle; and

DETAILED DESCRIPTION

The detailed description set forth below in connection with the appended drawings is intended as a description of the presently preferred embodiments of light guard assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 2:
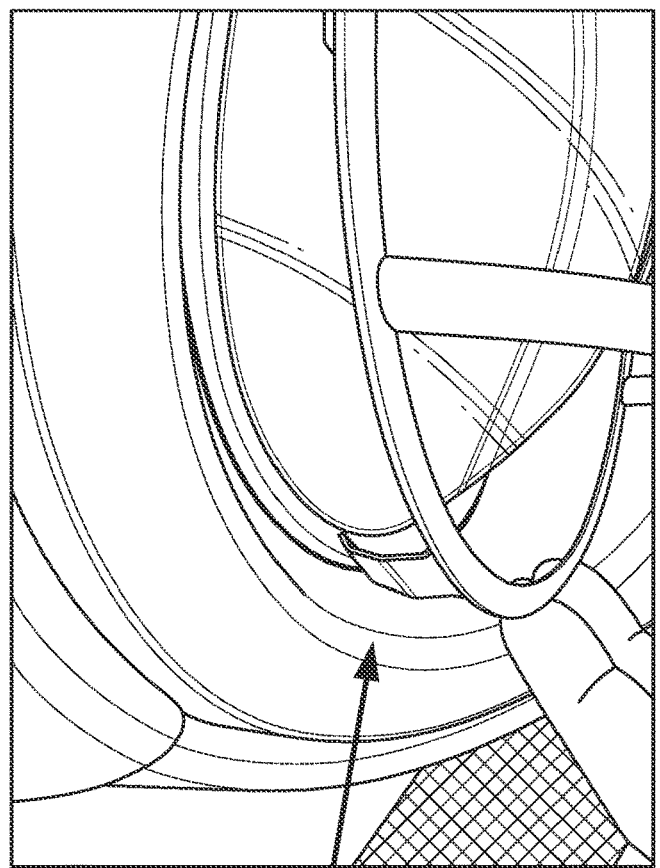
FIGS. 1 and 2 show an embodiment of a prior art light guard.
Figure 1:
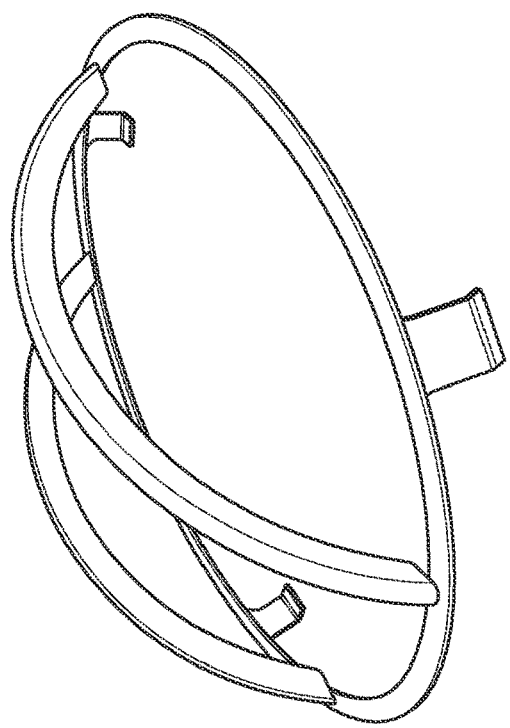
Figure 8:
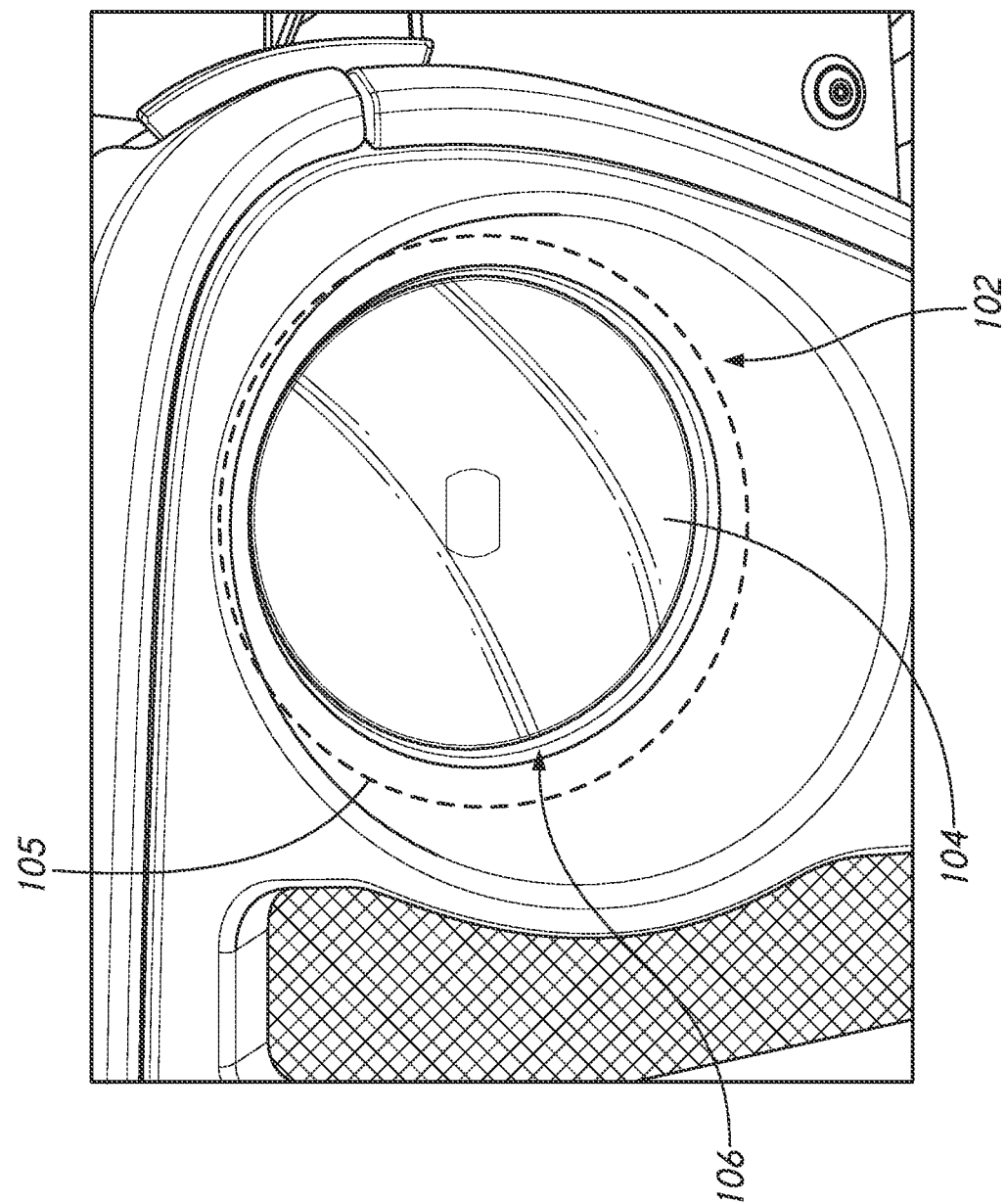
FIG. 8 shows an embodiment of a light of a vehicle.
Figure 10B:
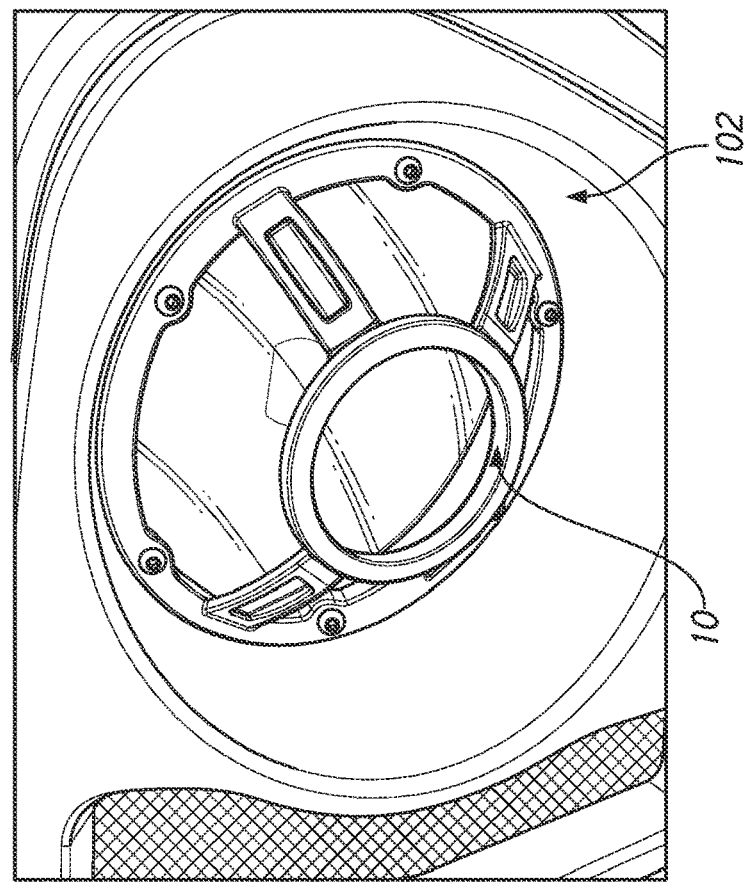
FIGS. 10A and 10B show a method of installing a light guard on the frame of FIG. 9A.
Figure 10A:
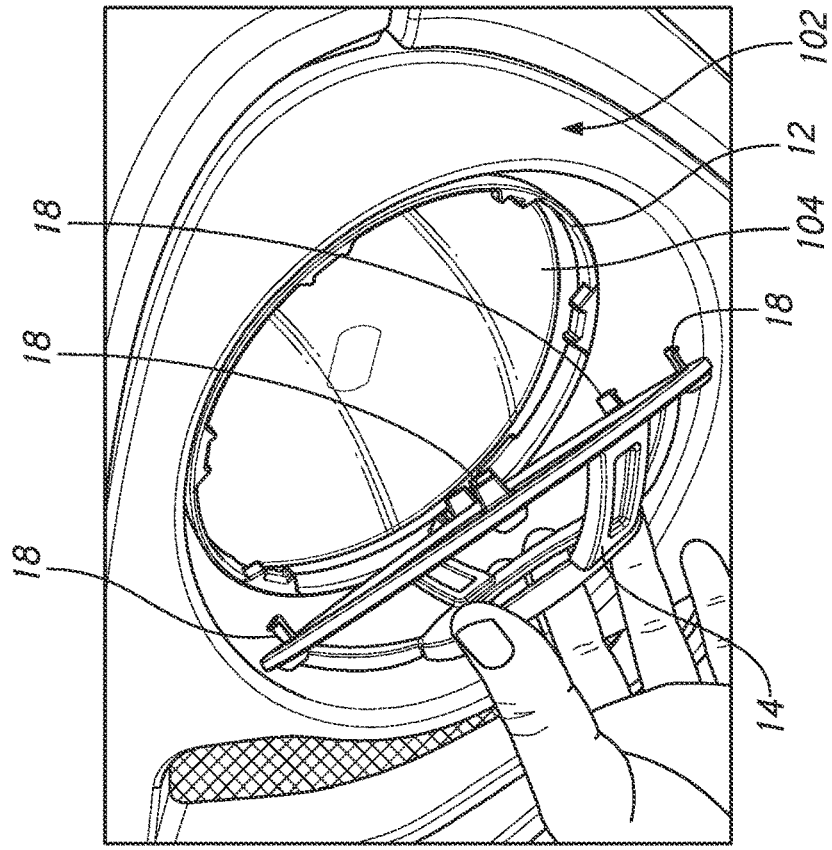

FIGS. 1 and 2 illustrate an embodiment of a prior art light guard. Certain existing light guards can clip directly on to the outer edge of a headlight on suitable vehicles. The size of the grille shell, the openings in the grille shell, and/or the lights can vary on different vehicles or vehicle models. On certain vehicles, only a portion of the headlight of the vehicle is visible through an opening in the vehicle's grille shell (e.g., diameter 105 of light 104 shown in FIG. 8). In those situations, the grille shell would need to be removed to provide access to the outer edge of the headlight so that the light guard could be attached directly to the headlight.

Figure 3B:
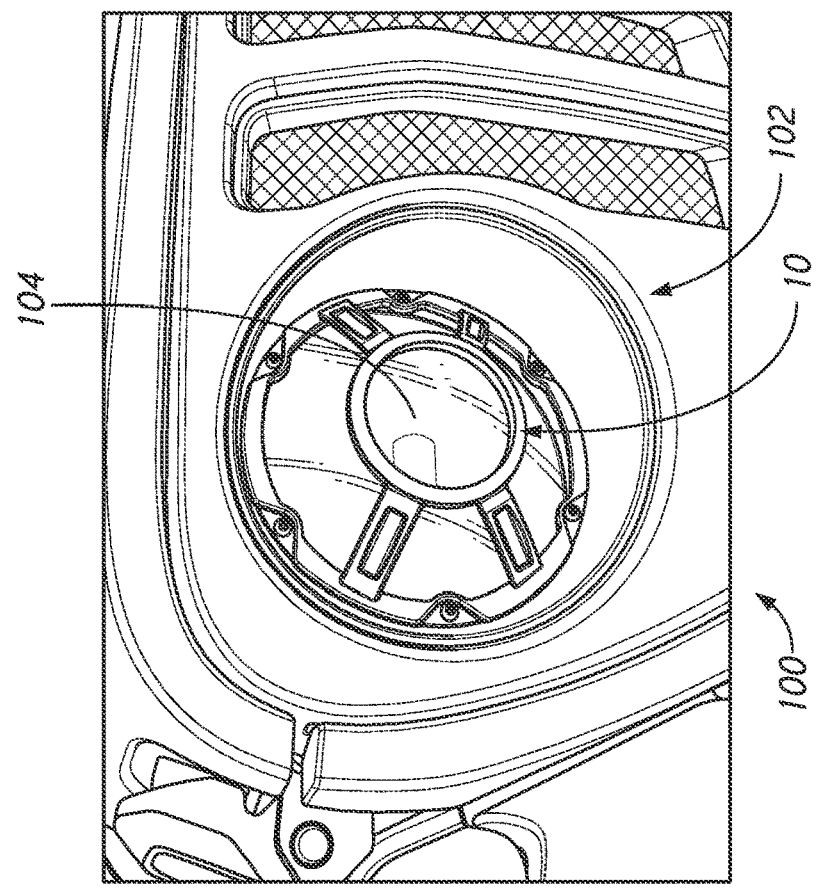
FIGS. 3A and 3B show embodiments of a light guard assembly assembled on a vehicle.
Figure 3A:
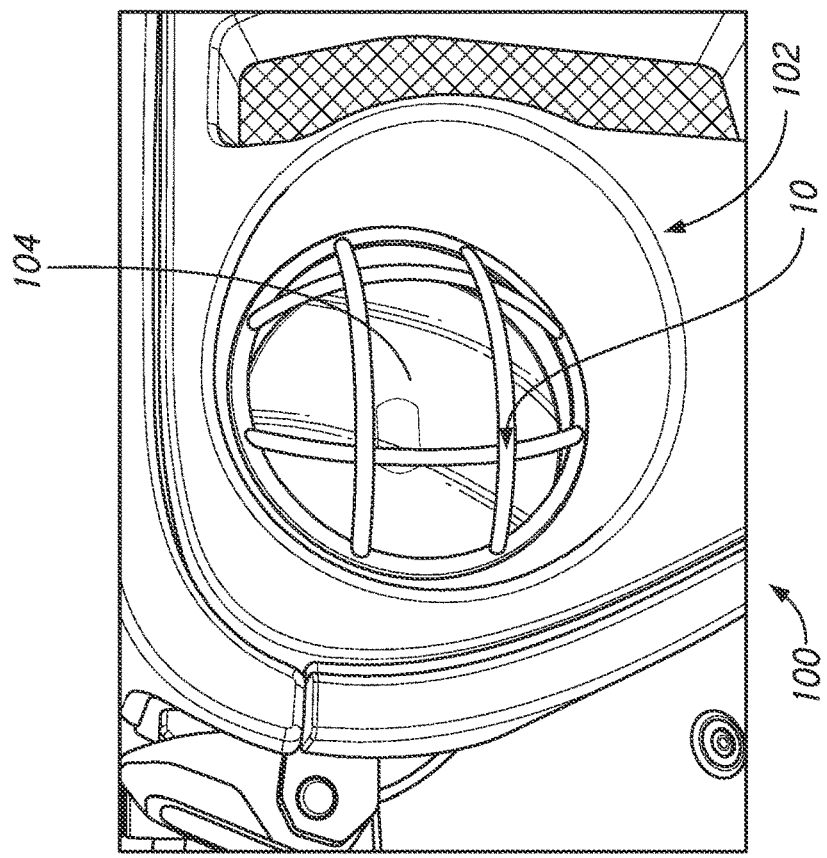
Figure 4B:
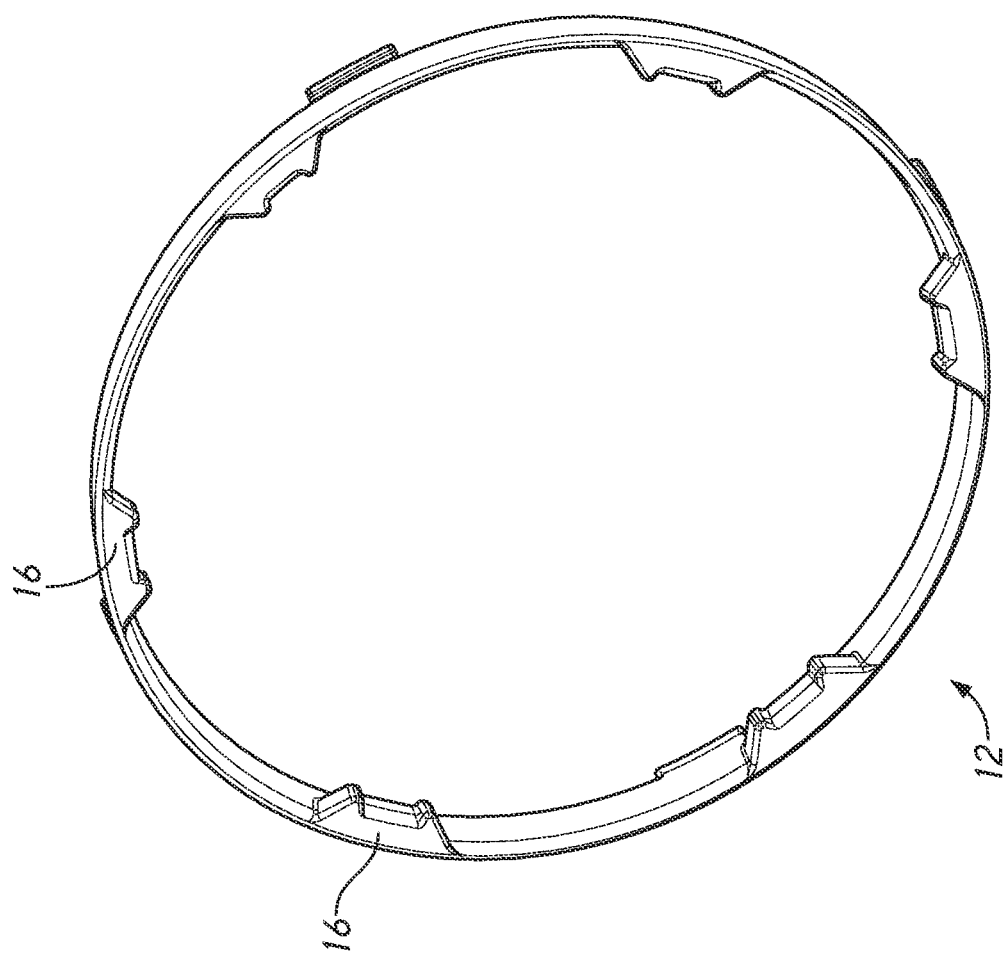
Figure 4A:
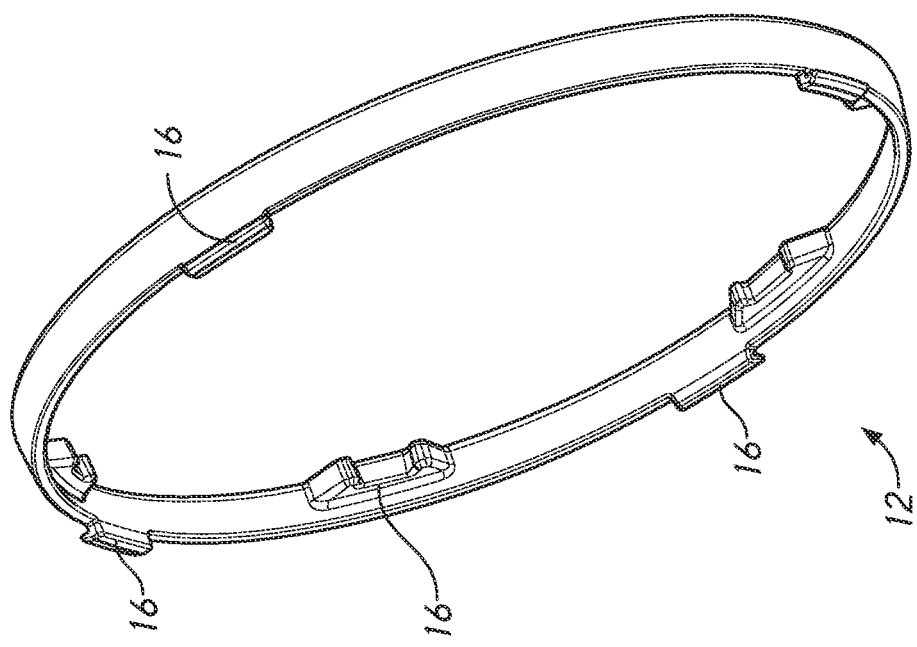
Figure 6B:
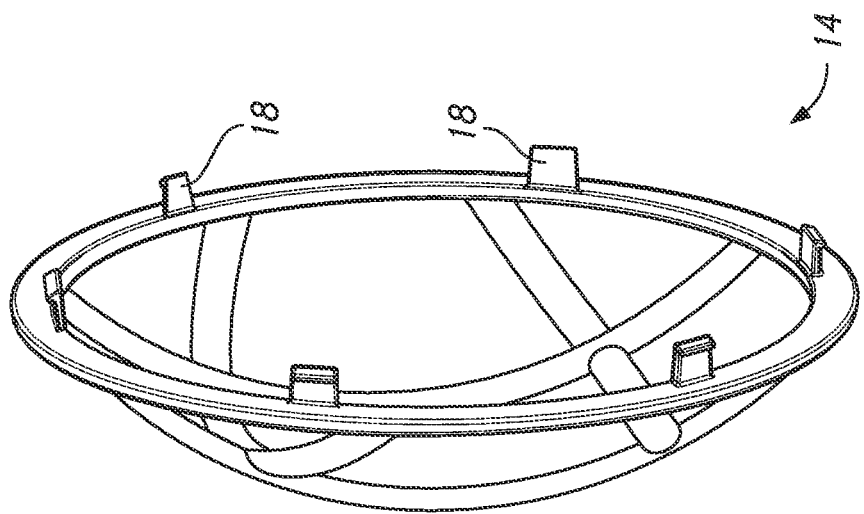
Figure 6A:
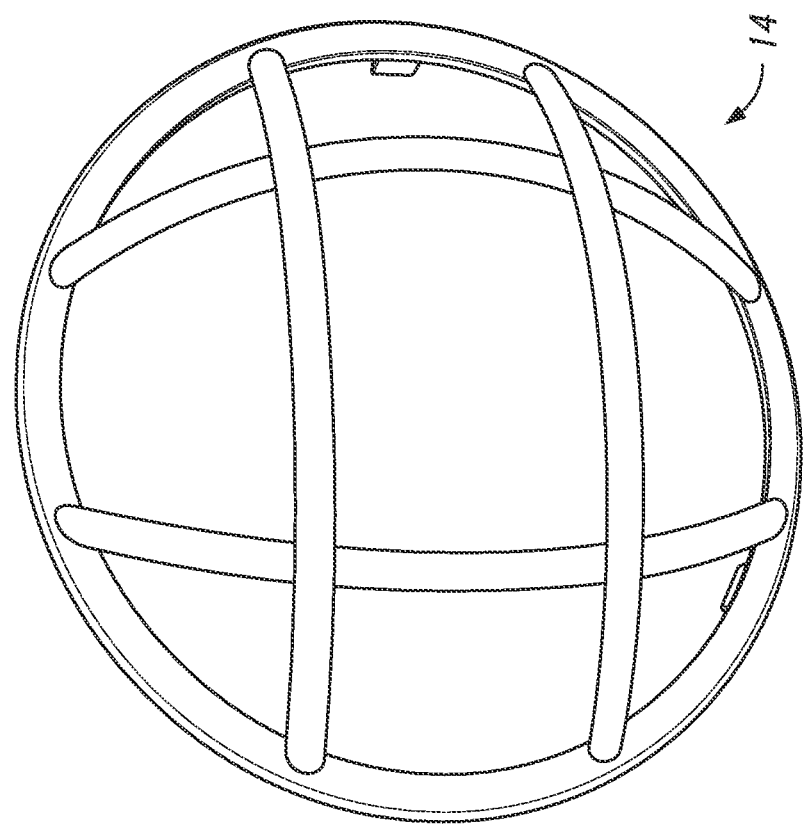

FIGS. 3A and 3B illustrate embodiments of a light guard assembly 10 installed on a vehicle 100. The light guard assembly 10 can advantageously protect lights, such as headlights, taillights, turn indicators, etc., on the vehicle 100. For example, at least one beam can extend across a front face of the light guard assembly 10 thereby protecting the light 104 from damage, such as from debris or through impact. In some embodiments, the light guard assembly 10 can be made of plastic and/or metal.

In some embodiments, the light guard assembly 10 can include a frame 12 and a light guard 14. The frame 12 can be integral with the light guard 14 or the frame 12 and the light guard 14 can be separate components. As shown in FIGS. 4A, 4B, 5A, and 5B, the frame 12 can vary in size and configuration to accommodate different sized grille shells 102 and/or lights 104. For example, the edge of the opening of the grille shell 102 that is adjacent to the light 104 can vary for different vehicles or different models of vehicles. In some embodiments, the grille shell 102 can be a single component and/or can comprise multiple components.

In some embodiments, the frame 12 can include a first mounting portion 16 comprising clips, projections, grips, latches, and/or adhesive, etc. The first mounting portion 16 can be compatible with the edge of the opening 106 in the grille shell 102 adjacent the light 104. The frame 12 can attach to the edge of the opening 106 such that there is a gap between the light 104 and the frame 12. For example, in some embodiments, the frame 12 does not contact a portion of the light 104 (e.g., a surface of the light 104), including the lens and any mounting assembly for the light, when the frame 12 is attached to the vehicle 100. In some embodiments, the frame 12 contacts a portion of the light 104 (e.g., a surface of the light 104), including the lens and any mounting assembly for the light, when the frame 12 is attached to the vehicle 100.

In some embodiments, a light guard 14 is provided. The light guard 14 can be compatible with multiple variations of the frame 12, such as different sized frames. In some methods, a first frame and a second frame of differing sizes are provided and the frame that suits the vehicle is selected. The light guard 14 can have a front face and a second mounting portion 18 comprising clips, projections, grips, latches, and/or adhesive, etc. The first mounting portion 16 and the second mounting portion 18 can be similar to one another or can be different from one another. The light guard 14 can be connected to the frame 12 before the frame 12 is attached to the vehicle 100 and/or after the frame 12 is attached to the edge of the opening 106 adjacent the light 104.

As shown in FIGS. 6A, 6B, 7A, 7B, and 7C, the style of the light guard 14 can vary. The light guard 14 can include at least one and desirably multiple members (such as a beam or bumper portion) extending across the front face of the light guard. This can advantageously protect the light 104 covered by the light guard assembly 10 from damage, such as from debris or impact, when the light guard assembly 10 is installed on the vehicle 100. Desirably, the at least one member or beam forms a portion of a cage extending across at least the majority of the span of the front face in at least one direction.

The light guard assembly 10 can be assembled on the vehicle 100 without removing the grille shell 102 from the vehicle 100. This advantageously allows for a quick and secure installation of the light guard assembly 10. The manner in which the light guard assembly 10 can attach to the edge of the opening 106 adjacent the light 104 prevents potential difficulties that could be associated with the inability of the user to access outer edges of the light 104 that are not visible and/or accessible when the grille shell 102 of the vehicle is attached to the vehicle 100.

In some embodiments, a kit including at least two frames 12 and a light guard 14 is provided. In some embodiments, a rear portion of each of the two frames can differ in size (e.g., diameter) while a front portion of each of the two frames can be similarly sized, allowing the same light guard 14 to connect to either of the frames.

From the foregoing description, it will be appreciated that inventive light guard assemblies and related methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations and/or "some embodiments" can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A light guard assembly, comprising:
   a ring-shaped frame with a first mounting portion configured to couple to an annular inner edge of a grille shell of a vehicle, wherein the annular inner edge of the grille shell is disposed adjacent to a light, wherein the frame attaches to the annular inner edge of the grille shell at a location in front of the light; and
   a light guard with a front face and a second mounting portion configured to attach to the ring-shaped frame;
   wherein the light guard comprises at least one beam projecting outward away from the first mounting portion and the second mounting portion.

2. The light guard assembly of claim 1, wherein there is a gap between the light and the frame when the frame is attached to the vehicle.

3. The light guard assembly of claim 1, wherein at least one of the first mounting portion and the second mounting portion comprises a clip.

4. The light guard assembly of claim 1, wherein each of the first mounting portion and the second mounting portion comprises a clip.

5. The light guard assembly of claim 1, wherein the at least one beam comprises a portion of a cage extending across at least the majority of the span of the front face in at least one direction.

6. The light guard assembly of claim 1, wherein the light guard assembly is configured to be attached to the vehicle without removing the grille shell of the vehicle.

7. The light guard assembly of claim 1, wherein the frame and the light guard are integral.

8. The light guard assembly of claim 1, wherein the frame and the light guard are separate components.

9. A method of installing a light guard assembly on a vehicle, the method comprising:
   attaching a selected ring-shaped frame with a first mounting portion to an annular inner edge of a grille shell of the vehicle, wherein the annular inner edge of the grille shell is disposed adjacent to a light while the grille shell is attached to the vehicle; and
   attaching a light guard with a front face and a second mounting portion to the selected frame while the grille shell is attached to the vehicle;
   wherein the light guard comprises a plurality of members extending across the front face of the light guard; and
   wherein the light guard assembly is attached to the vehicle without removing the grille shell.

10. The method of claim 9, wherein the selected frame is attached to the annular inner edge of the grille shell of the vehicle without contacting a surface of the light.

11. The method of claim 9, wherein the light guard is attached to the selected frame before the selected frame is attached to the annular inner edge of the grille shell of the vehicle.

12. The method of claim 9, wherein the selected frame is attached to the annular inner edge of the grille shell of the vehicle before the light guard is attached to the selected frame.

13. The method of claim 9, further comprising providing a first frame and a second frame, the first frame and the second frame having different sizes.

14. The method of claim 13, wherein the sizes of the first frame and the second frame correspond to a size of an opening in the grille shell.

15. The method of claim 13, further comprising selecting one of the first frame and the second frame.

* * * * *

UNITED STATES PATENT AND TRADEMARK OFFICE
CERTIFICATE OF CORRECTION

PATENT NO. : 10,919,434 B2
APPLICATION NO. : 16/593156
DATED : February 16, 2021
INVENTOR(S) : Carlos Gutierrez Page 1 of 1

It is certified that error appears in the above-identified patent and that said Letters Patent is hereby corrected as shown below:

In the Claims

In Column 6, Line 16 (Approx.), Claim 9, delete "light" and insert --light,--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*